Oct. 27, 1970 R. BIXBY 3,535,924
BATHYTHERMOGRAPH SYSTEM
Filed Sept. 11, 1969 4 Sheets-Sheet 1
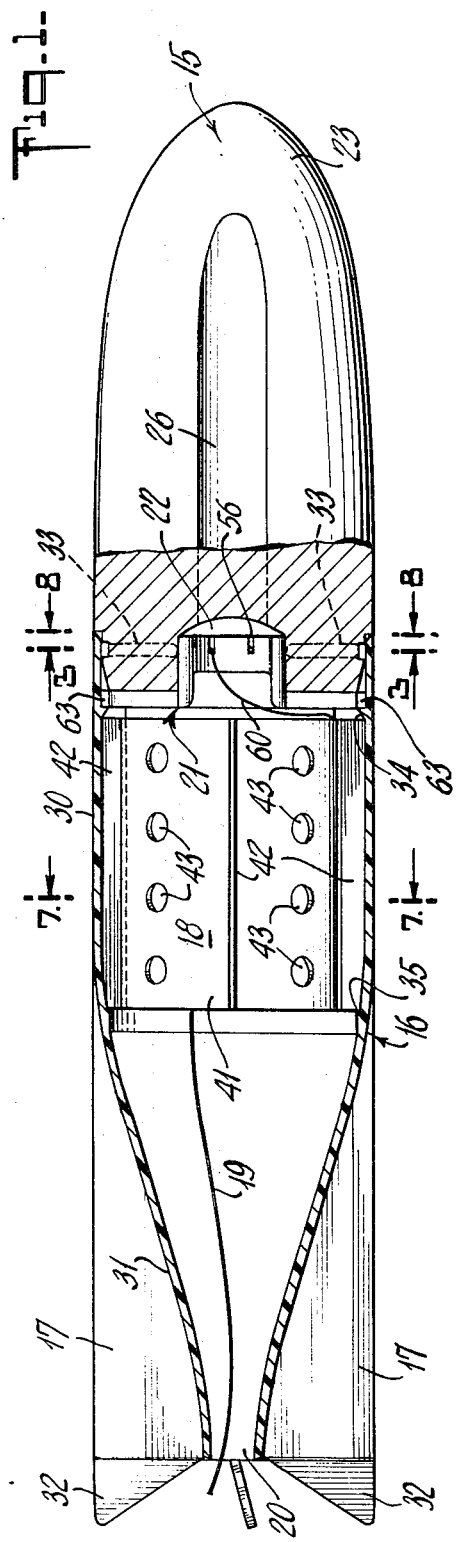
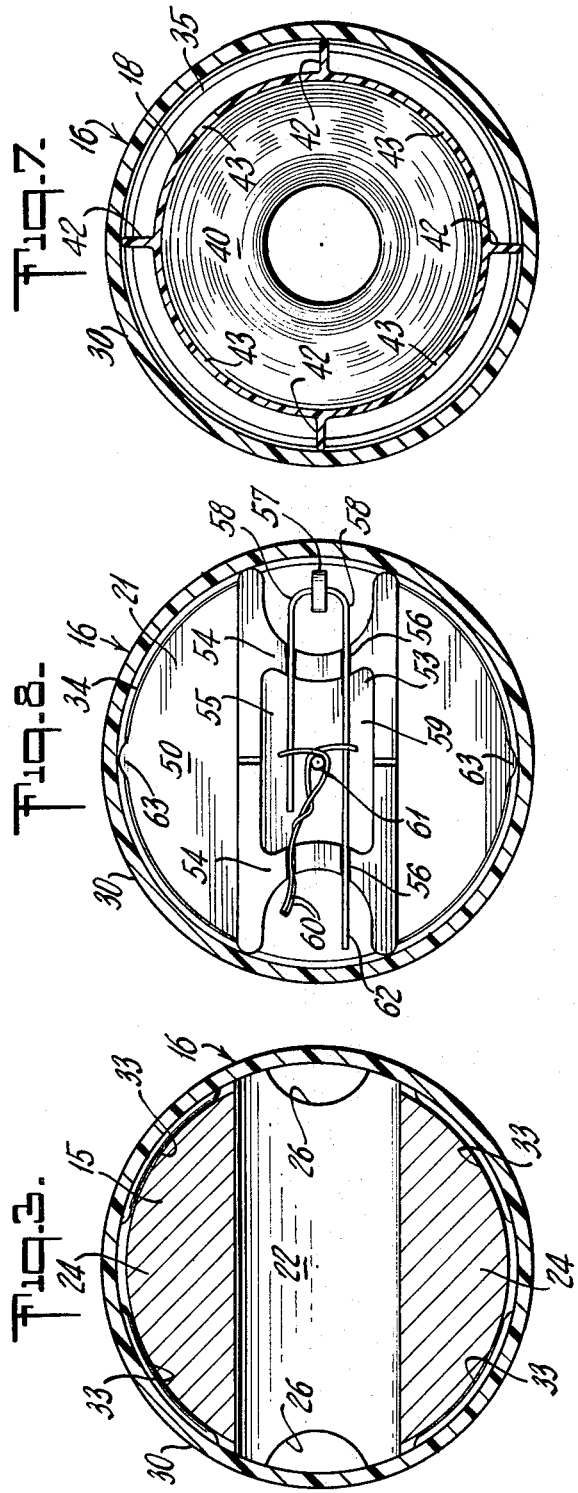
INVENTOR
RICHARD BIXBY
BY
Nolte & Nolte
ATTORNEYS

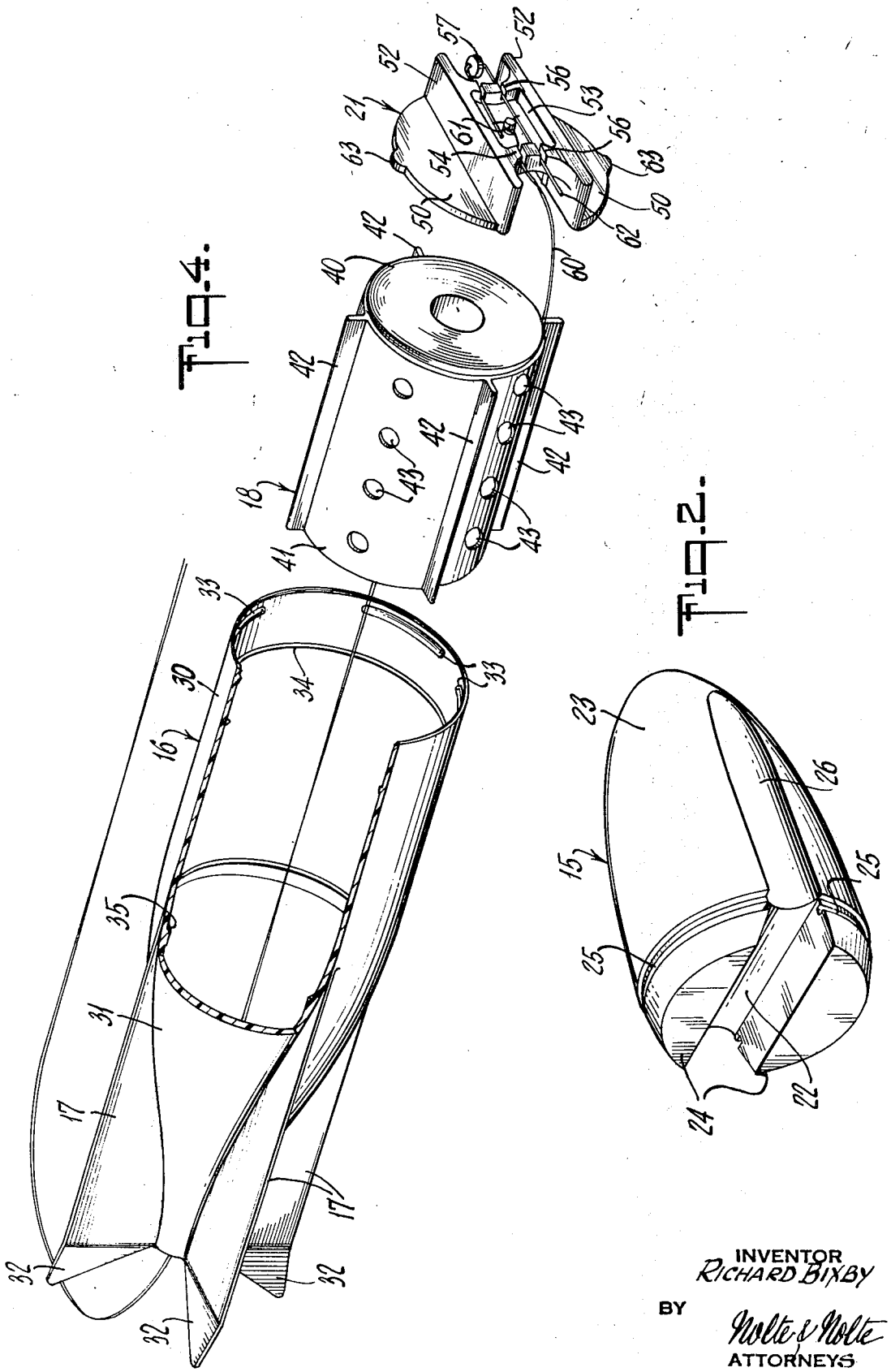

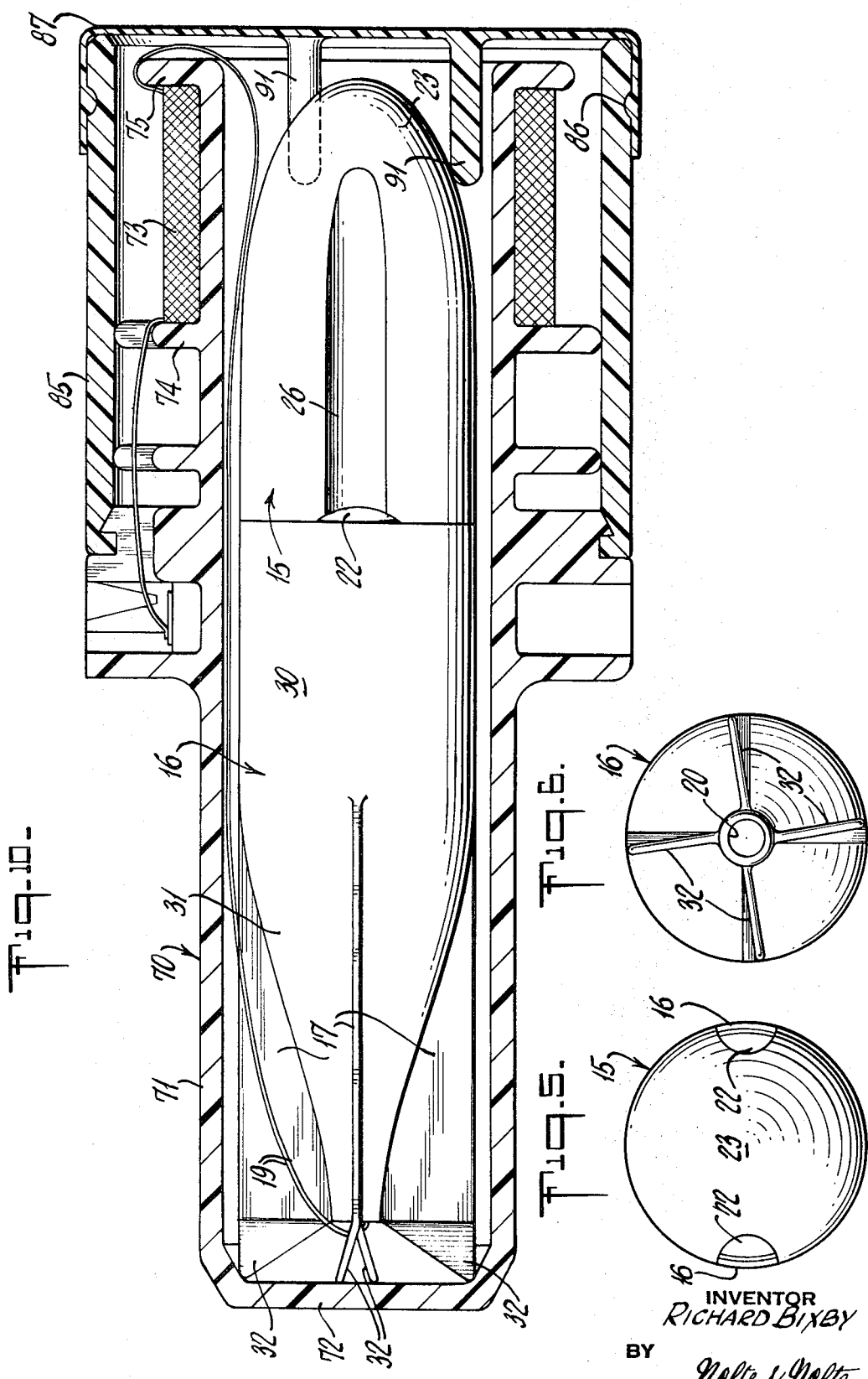

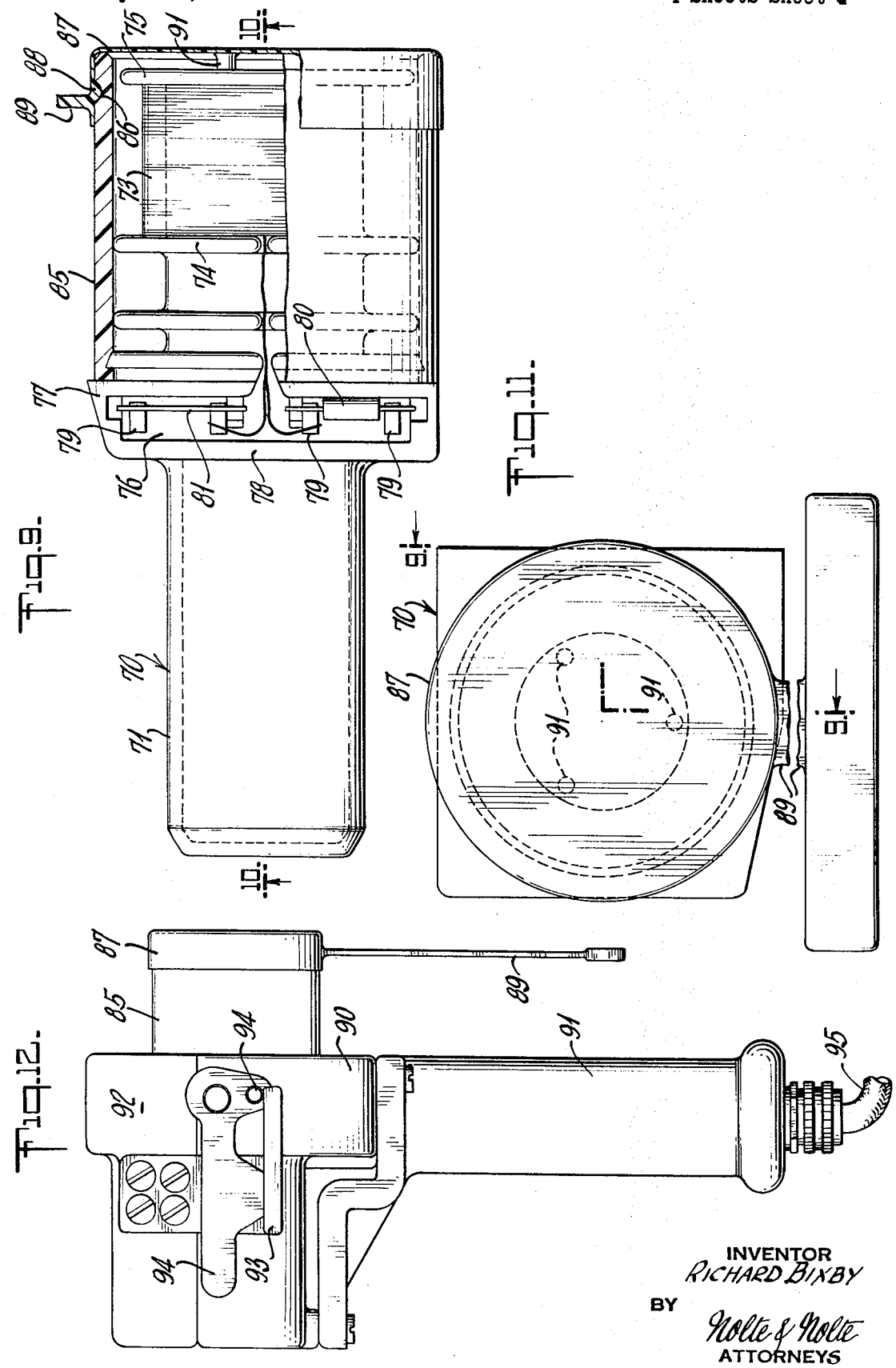

United States Patent Office 3,535,924
Patented Oct. 27, 1970

1

3,535,924
BATHYTHERMOGRAPH SYSTEM
Richard Bixby, Little Compton, R.I., assignor to Buzzards Corp., Marion, Mass., a corporation of Massachusetts
Continuation-in-part of application Ser. No. 630,746, Apr. 13, 1967. This application Sept. 11, 1969, Ser. No. 857,177
Int. Cl. G12b 9/00, 9/04, 9/06
U.S. Cl. 73—170
15 Claims

ABSTRACT OF THE DISCLOSURE

A bathythermograph system employs an expendable probe that has external symmetrical grooves on its nose portion to direct water to measuring devices in the tail portion. The probe is adapted to be stored in a hollow cylinder having a coil wound on its external surface. A cannister surrounds the coil and has a removable cover for releasing the probe.

---

This application is a continuation-in-part of application Ser. No. 630,746, filed Apr. 13, 1967, now abandoned.

This invention relates to apparatus for measuring various properties, such as temperature, of a body of water such as the ocean, as a function of depth of the body of water.

In the past, many arrangements have been provided for measuring the properties of a body of water as a function of depth. For example, as disclosed in U.S. Letters Patent No. 3,221,556, Campbell et al., an expendable ballistic bathythermograph system is disclosed in which a probe unit is adapted to be launched in the body of water, and to descend ballistically through the body of water. The probe unit includes a measuring device, such as a thermistor, and the thermistor is connected by way of a spool of wire in the probe and a spool of wire on the measuring vessel, to a recording device, so that electrical measurements responsive to the resistance of the thermistor may be recorded as a function of time, in order to indicate the temperature-depth profile of the body of water.

When expendable components are to be employed for the measurement of the characteristics of the body of water, it is, of course, desirable that the cost of the units be minimized, and it is also desirable that the size and weight of the units be minimized in order that the devices be more adaptable to shipping and storage, and that they require a minimum of shipboard storage space. In addition, since it may be desirable to hand launch the probes, a reduction in weight of the units facilities the measuring operation. It has furthermore been found desirable to provide means for storing and shipping the devices in a sealed condition, so that their reliability is not affected by environmental conditions such as humidity and salt spray, and also that the danger of physical damage to the units prior to launching is minimized.

It is therefore an object of this invention to provide a relatively small probe assembly which is inexpensive to manufacture and lighter in weight than probes known to the art.

A further object of the present invention is to provide a spool and cannister assembly in which the probe assembly may be initially disposed within a spool carrying the wire wound in spinning-reel configuration such that the internal volume of the cannister and spool assembly may be reduced to that required merely to house the spool and winding.

According to the invention, the above and other objects are achieved by providing a probe assembly comprising a solid generally bullet shaped nose portion, and a hollow tail portion enclosing a spool of wire and the desired measuring devices, such as the thermistors, sa-

2 linity measuring devices, etc. The nose portion, which also serves as a weight so that the probe descends ballistically in the water, is provided on its outer surface with two or more symmetrically disposed axially extending grooves. Each of the measuring devices in the tail portion is aligned with one of the nose portion grooves, so that as a probe descends in the water, the water moves through the grooves and passes the respective measuring device, the water thereupon being directed through the center of the spool and out of the rear of the tail portion.

In previous measuring probes, the water has generally been directed through an axially extending hole in the center of the probe. Although such an arrangement is satisfactory from the standpoint of the measurement to be taken, it has been found that the size of the nose portion must be increased in order to provide the necessary weight, due to the provision of the central aperture. In other words, when the size of the probe is minimized, a central aperture must have a diameter large with respect to the probe in order to provide the necessary flow of water past the measuring device, and in view of the large percentage of material that must be removed, the size of the probe must be increased so that it has the necessary weight. When the grooves are provided on the external surface of the nose portion, as in the present invention, the nose may be considerably smaller, since the grooves do not extend through the entire length of the nose portion. The measuring devices are disposed on a platform in the tail portion, so that they are held in alignment with the grooves. The arrangement is readily assembled since the tail portion is adapted to be snapped into position on extending bosses on the nose portion.

The spool assembly according to the invention is comprised of a hollow cylinder having one enclosed end, so that the probe assembly may be inserted in the open end. The wire on the spool is wound between suitable ridges on the external surface of the cylinder, and connected on one end to the wire extending from the rear of the probe, and on the other end to contact terminals in a receptacle in the central portion of the cylinder. A cannister is sealed over the spool of wire, and a removable cover seals the end of the cannister and the open end of the cylinder, and holds the probe assembly in place within the cylinder. The arrangement is thus very compact, and has a maximum package density, and protects the elements from physical damage and other environmental conditions during shipment and storage. The apparatus is easy and simple to use in measuring the characteristics of a body of water.

The invention will be now more fully described with reference to the accompanying drawings in which FIG. 1 is a partially cross-sectional view of a bathythermograph probe, according to one embodiment of the invention.

FIG. 2 is a prospective view of the nose portion of the probe of FIG. 1.

FIG. 3 is a cross-sectional view of the probe of FIG. 1 taken along the lines 3—3.

FIG. 4 is an exploded partially cross-sectional view of the rear portion of the probe of FIG. 1.

FIG. 5 is a view of the right end of the probe of FIG. 1.

FIG. 6 is a view of the left end of the probe of FIG. 1.

FIG. 7 is a cross-sectional view of the probe of FIG. 1 taken along the lines 7—7.

FIG. 8 is a cross-sectional view of the probe of FIG. 1 taken along the lines 8—8, with the nose portion removed for the sake of clarity.

FIG. 9 is a partially cross-sectional view of the spool assembly according to one embodiment of the invention.

FIG. 10 is a cross-sectional view of the spool assembly of FIG. 9 in combination with the probe of FIG. 1.

FIG. 11 is a plan view of the right end of the assembly of FIG. 9.

FIG. 12 is a plan view of a hand launcher which may be employed to launch the probe according to the invention, and illustrating the spool assembly in position in the hand launcher prior to the launching operation.

Referring now to the drawings, and more in particular to FIG. 1, therein is illustrated a ballistic probe according to one embodiment of the invention. The probe is comprised of a weighted nose portion 15 affixed to a hollow tail portion 16, the tail portion having stabilizing fins 17. A wire spool assembly 18 is held within the hollow tail portion, with one end of the wire 19 from the spool assembly extending rearwardly through an aperture 20 at the rear end of the tail portion. A platform assembly 21 is affixed to the forward end of the spool assembly 18, and projects into a transverse groove 22 in the rear end of the weighted nose portion 15.

The nose portion 15, which may be formed of a heavy metal such as lead, is generally cylindrical and has bullet shaped forward end 23 (see also FIG. 2). The rear end of the nose portion 15 has a reduced diameter to form a pair of bosses 24 of generally semi-circular cross-section separated by the groove 22. The outer periphery of the bosses 24 is supplied with a retaining groove 25 to hold the tail portion 16 in a manner to be more fully described in the following paragraphs.

As shown in FIGS. 2 and 3, the nose portion also has a pair of symmetrically disposed grooves 26 in its outer periphery. The grooves 26 are aligned with a transverse groove 22 and as shown in FIGS. 1 and 2, the axes of the grooves 26 are substantially parallel to the axis of the nose portion 15, so that the front end of the grooves 26 does not extend to the front end of the nose portion 15. While the grooves 26 are preferably shaped to have cross-sections that are circular segments, for ease in manufacturing, and straight to avoid cavitation, it will be understood that any shape is satisfactory as long as it minimizes turbulence. Similarly, while only two grooves are shown, it will be obvious that additional symmetrically disposed grooves may also be provided as desired, in combination with additional transverse grooves, if it is desired to increase the number of parameters that the device is to measure.

Referring to FIGS. 1 and 4, the hollow tail portion 16, which may be formed of a plastic material, has a front portion 30 of substantially constant diameter, and a tapering rear portion 31. The fins 17 being affixed to the tapering portion 31. The rear portions 32 of the fins 17 may be slightly bent so that the probe unit rotates as it descends in a body of water. Radially inwardly extending ridges 33 near the front end of the portion 30 are adapted to engage the groove 25 in the nose portion, so that the nose portion 15 may be inserted with the bosses 24 within the tail portion 16, and be snapped in place with the ridges 33 engaging the grooves 25. This arrangement permits the simple and economical assembly of the probe unit. The inside of the portion 30 of the tail portion is also provided with an annular ridge 34 a short distance behind the ridges 33, and an annular ridge 35 in the region of the junction of tail portions 30 and 31 for a purpose to be more fully described hereinafter.

The outward appearance of the probe unit of FIG. 1 from the front and rear directions, is shown in FIGS. 5 and 6 respectively.

Referring now to FIGS. 1, 4 and 7, the wire spool assembly 18 is comprised of a hollow spool 40 of wire axially aligned with respect to the probe, with the inner end extending upwardly through the tail of the probe, and the outer end extending forwardly for connection to sensing devices to be described in the following paragraphs. The turns of the coil are held together with an adhesive compound, for example my impregnation of the coil with a thin adhesive, so that the wire 19 may be uncoiled from coil 40 readily without affecting substantially the ballistic movement of the probe during its descent in the water. A plastic sleeve 41 may be shrunk fit over the outside of the coil 40 in order to more firmly hold the coil together and to provide means to position the coil within the tail assembly. The plastic sleeve 41 may have radially outwardly extending ribs 42 adapted to engage the inner walls of the tail portion 30 for holding the coil of wire in position within the probe. The rear end of the plastic sleeve 41 is further adapted to engage the ridge 35 in the tail portion 16 for axially positioning the coil 40. The plastic sleeve 41 may, if desired, be provided with apertures 43. The ribs 42 may be formed by flattening a tubular sleeve of plastic material, sealing the opposite longitudinal edges thereof to form a pair of ribs, and repeating the process with the sleeve rotated through an angle of 90 degrees to form the remaining ribs.

The platform assembly 21 which is shown in FIGS. 1, 4 and 8, is comprised of a pair of spaced apart semi-circular plates 50, generally rectangular plate members 52 extending transversely from the plate members 50 at their adjoining edges, in parallel relationship, and a bridge 53 interconnecting the plate members 52. The members 50 through 53 may, of course, be formed as a unit, for example, molded from a plastic material, so that the individual portions do not necessarily define separate structures. The member 21 is adapted to be fixed to the end of coil 40, for example, by the use of an adhesive, with the plate members 50 bearing against the coil 40 and the plate members 52 extending into the groove 22 on the nose portion. The bridge 53 does not extend rearwardly of the plaform as far as the plates 50 and similarly does not extend radially as far as the groove 26 in the nose portion, so that as the probe descends in the water, fluid passes through the grooves 26 to the region between the plates 52 on each side of the bridging member 53, thence behind the bridge 53, through the center of the coil 40 and thence outwardly through the aperture 20 in the rear of the tail portion 16. The bridge 53 includes a pair of axially extending semi-circular walls 54 axially aligned with the edges of the grooves 26, and a closed bottom 55 between the walls 54, thereby defining an enclosure opening toward the nose portion 15. The walls 54 may be provided with a plurality of conductor holding notches 56 so that a thermistor 57 may be mounted in alignment with one of the grooves 26, the leads 58 of the thermistor extending through the notches 56 and into the enclosure. The leads 60 from the other end of the coil 40 extend through a notch 56 in the other wall 54, and are connected in the enclosure 59 to the leads 58, thereby providing a continuous connection between the thermistor 57 and the leads 19 extending through the rear of the probe. If desired, a post 61 may be provided in the enclosure 59 for holding the leads 60. In addition, a lead 62 may be provided aligned with the other groove 26, extending through a notch 56, and being connected to one of the leads 58 within the enclosure 59. The lead 62 serves as a splash down electrode, in order to provide means for detecting the time of entry of the probe into the water, as explained in more detail in the Letters Pat. No. 3,221,556, Campbell et al. The enclosure 59 may be filled with a waterproof insulating compound in order to firmly hold the thermistor 57 in place during descent of the probe in the water. The plates 50 are provided with radially extending projections 63 adapted to engage the front edge of the ridge 34 in tail portion 30, for holding the platform member in position after the probe has been assembled. When the nose portion 15 is snapped into the tail portion 30, with the grooves 25 engaging the radius 33, the plate 52 and bridge 53 of the platform extend into the groove 22 of the nose portion 15, and the bosses 24 engage the front of the plates 50 to hold the platform assembly and coil assembly from forward movement.

The probe unit discussed above is adapted to be launched into a body of water, and to descend ballistically through the water to provide an indication of the characteristics of the water, for example, on a surface vessel. As disclosed in the above Pat. No. 3,221,556, it is desirable to have a spool of wire aboard the vessel, so that the wire is also unwound from a spool on the vessel in order that the movement of the vessel does not interfere with the ballistic movement of the probe. It has been found to be desirable that the spool and probe form a sealed unit prior to launch of the probe so that the combination can be readily stored and shipped without damage, and is not subject to environmental conditions.

A suitable spool assembly for use in combination with the probe of FIG. 1, is illustrated in FIGS. 9 and 10. Referring now to these figures, the spool unit is comprised of a generally cylindrical spool body member 70, which may be molded of a plastic material such as polystyrene. The cylindrical member 70, has a cylindrical base 71 with one closed end 72. The cylindrical base 71 is adapted to enclose the probe with the fins of the probe against the closed end 72. The closed end 72 is shaped to hold the tail end of the probe centrally within the base 71. The diameter of the base 71 is slightly greater than the diameter of probe so that there is sufficient clearance for the wire 19 to pass between the probe and the walls of the base 71 throughout the length of the base member 71. A spool 73 of wire is wound on the base 71 adjacent to the open end between outwardly extending annular ridges 74 and 75. The wire 19 extends through the open end of the base 71, and around the ridge 75 to form an end of the spool 73. The edges of the ridge 75 are rounded, so that the wire can be readily unwound from the spool 73 when the probe is launched.

A contact receptacle 76 is molded on the base 71 at a central location on the spool body member. The contact receptacle 76 may, for example, be formed between a pair of generally rectangular axially spaced lateral projections 78 and 77, with the projections 78 and 77 being suitably bridged on one side of the base member 71 to form the receptacle 76. A plurality of the conductive contacts 79 are fixedly mounted in the bottom of the contact receptacle 76 and leads from the other end of the coil 73 extend through notches in the ridge 74 and projection 77 to selected contacts 79. The receptacle 76 may be provided with more contacts than conductors in the wire of coil 73, in order to facilitate use of the spool assembly for different types of operation. For example, a resistor 80 may be connected between a pair of the contacts, and a short lead 81 may be connected between another pair of the contacts. The receptacle 76 is adapted to be filled with a waterproof insulating compound, so that projecting pins from the launching device may penetrate the compound to engage the contact 79 when it is desired to launch the probe.

A cannister 85 is in the form of an open ended cylinder is positioned over the coil 73, and an annular internal groove adjacent to one end may be provided to engage an annular ridge on the projection 77, so that the cannister 85, which may be of a polyethylene material, can be snapped into place to form a seal against the projection 77. The other end of the cannister 85 extends beyond the body member 71, and is provided with an external groove 86. A releasable cover member 87 is provided for sealing the end of the cannister 85 and the open end of base member 71. The cover member 87 is in the form of a cap having an internal annular ridge 88 adapted to serially engage the groove 86. The cover 87 is preferably made of a flexible plastic material, and is provided with a handle 89 toward the right (referring to the arrangement of FIGS. 9 and 10). The cover member 87 is also provided with at least three internal projections 91 adapted to extend into the hollow base member 71 and engage the nose portion of the probe, to thereby center and hold the nose end of the probe during shipment and storage of the device. FIG. 11 illustrates the assembly of FIGS. 9 and 10 as seen from the right side of FIGS. 9 and 10.

The previously described spool and probe assembly may be launched by means of any suitable device which holds the device and provides contacting pins for making the desired electrical connection to the contacts 79. For example, as shown in FIG. 12, a hand held launching device is comprised of a housing assembly 90 to which a handle 91 is affixed. A cover assembly 92 is hinged to the housing assembly 90, so that the cover assembly may be opened to permit the central and rear portions of the spool assembly to be positioned in the shaped recess within the housing assembly. The housing assembly 90 is provided with contact pins (not shown) adapted to penetrate the compound on the contact receptacle when the cover assembly 92 is closed. In order to hold the cover assembly 92 in position, the cover assembly is provided with a keeper plate 93, and a hinged lever 94 on the housing assembly 90 is provided with a pin 94 adapted to engage and hold the keeper plate 93 with the cover assembly in closed position. The handle 91 is hollow for receiving a cable 95 connected to the contact pins. If desired, the launching assembly may be provided with an internal magnetically operated switch for interrupting the connection between the contact pins and the cable 95, so that the connection is complete only when the cover assembly 92 is in its closed position on the housing assembly 90.

The above description of the launcher is exemplary only, and it will be obvious that other forms of launching assemblies may be employed in combination with the spool and probe of the present invention.

When a hand launcher of the type shown in FIG. 12 is employed to launch the probe of the device according to the invention, the cover assembly 92 is opened, and the spool assembly, with the probe enclosed, is inserted in the housing assembly 90 with the contact receptacle 76 aligned with the contact pins within the housing assembly 90. The cover assembly 92 is then closed, whereby electric contact is established between the contacts 79 and the cable 95. The cable 95 being connected to a suitable recorder. The probe may then be launched by removal of the cover 87 by means of a forward movement of the handle 89. This permits the probe to drop out of the spool assembly, such as by the action of gravity, and into the water to commence a measuring cycle.

In winding the coils 40 and 73 from a continuous length of wire, it has been found advantageous to first wind the coil 73 directly on the base member 71. The coil 40 is then wound on a separate form on the same mandrel, so that the outside of coil 73 is connected to the inside of coil 40. The form is then removed from the coil 40. In winding these coils, of course, it must be remembered that the wire must extend through the aperture in the tail portion between the two coils. It may thus be desirable to extend the wire through the aperture 20 when winding the coil 73.

While only one embodiment of the inventon has been disclosed, it will be obvious that many variations and modifications may be made therein without departing from the spirit and scope of the invention.

What is claimed is:

1. A ballistic probe adapted to traverse a body of water for sensing a property of said water, said probe comprising an elongated, cylindrical nose portion having at least 2 symmetrically located axially extending grooves along its outer periphery, a tail portion mounted on the rearwardly extending end of said nose portion, said tail portion being hollow and having an aperture at the end thereof away from said nose portion, and sensor means for sensing said property of said water, said sensor means being positioned within the hollow interior of said tail portion adjacent the end of one of said grooves, whereby water flows through said grooves into said hollow interior engaging said sensor means, and out of said hollow interior by way of said aperture, as said probe traverses said water.

2. The probe of claim 1 wherein said nose portion comprises a plurality of rearwardly extending bosses on its rearward surface, said bosses positoned to engage the inner surfaces of said tail portion for holding said nose portion and tail portion together, said bosses further being separated to form a transverse channel, said sensor means being positioned in said channel.

3. The probe of claim 2 further comprising a coil of wire within said hollow interior, one end of said coil of wire extending through said aperture for connection to a measuring apparatus, the other end of said wire being connected to said sensor means, said coil of wire being positioned axially within said hollow interior whereby the flow of water directed into said hollow interior by said bosses flows through the center of said coil.

4. The probe of claim 3 wherein said coil of wire is impregnated with an adhesive material to maintain its shape, the end of said wire extending through said aperture being connected to the interior of said coil, and further comprising a heat shrinkable sleeve co-axially positioned on the outer periphery of said coil for holding said coil together.

5. The apparatus of claim 3 comprising a platform member affixed to the end of said coil of wire towards said nose portion, said platform member having a circular base portion and an axially extending portion extending into the spaces between said bosses, said axially extending portion having conductor holding means for holding said sensor means aligned with said grooves, said platform means further having apertures positioned to direct the flow of said water through the axis of said coil.

6. The probe of claim 5 wherein said platform member is glued to an end of said coil of wire.

7. The probe of claim 5 wherein said circular base portion is affixed to said coil, said circular base portion having a central portion thereof removed that it is in axial alignment with said grooves and the spaces between said bosses, said axial extending portions extending between said bosses from the edges of said removed portions of said base portion, and bridging portions extending between said axially extending portions in the region of said platform member between said bosses.

8. The probe of claim 5 wherein said holding means comprises conductor holding slits in said bridging members, said sensor means comprising a thermistor having first and second conductors, positioned in separate said slits, with the body portion of said sensor means being axially aligned with one of said grooves in said nose portion.

9 The probe of claim 8 wherein said sensor means is a thermistor.

10. The probe of claim 9 further comprising a conductor connected to one of the leads of said thermistor and extending to a position axially aligned with another one of said grooves in said nose portion, at least the end of said conductor aligned with said other groove and being electrically exposed for permitting detection of the entry of said probe into said body of water.

11. An assembly for measuring and testing a property of a body of water, said assembly comprising a ballistic probe adapted to be launched into and traverse said body of water, a spool unit, and a cannister unit; said probe comprising a solid elongated cylindrical nose portion having a plurality of symmetrically disposed axially extending grooves in the outer periphery thereof, a hollow finned tail portion secured to the rear end of said nose portion, wherby the grooves in said nose portion terminate in the hollow interior of said tail portion, said portion having a rearwardly extending aperture, a first spool of wire coaxially positioned within said hollow interior and having one end extending through said aperture, a platform member affixed to the forward end of said spool of wire and having holding means, sensor means for sensing said property of said water and being held in said holding means within said hollow interior adjacent the end of one of said groves, and means connecting the other end of said first spool of wire to said sensor means; said spool unit comprising a hollow cylinder having a closed end and an open end, a plurality of axially spaced annular ridges surrounding said hollow cylinder adjacent the open end thereof, a second spool of wire wound on said hollow cylinder between said ridges, encapsulated terminal means positioned on the outside of said hollow cylinder and connected to one end of said second spool of wire, said probe being positioned within said hollow cylinder with said tail portion adjacent said closed end and the end of the wire extending through said aperture being connected to the other of said second spool of wire; and said cannister unit comprising a second hollow cylinder having open ends, said second hollow cylinder surrounding said second spool of wire and having one end thereof sealed to said outer periphery of said first hollow cylinder between said second spool of wire and said terminal means, and a releasable cover over the other end of said second hollow cylinder for sealing said other end of said second cylinder and holding said probe within said first cylinder.

12. The assembly of claim 11 wherein said second spool of wire is wound with the inner turns connected to said terminal means and the outer turns connected to said first spool of wire, whereby said second spool of wire unwinds from the outer to the inner turns as said probe traverses said body of water following launching, and said first spool of wire is wound with the inner turns extending through said aperture and the outer turns connected to said sensor means, whereby said first spool of wire unwinds from the inside turns to the outside turns as said probe traverses said water following launching thereof.

13. A spool and cannister assembly for use in a system for measuring the properties of a body of water at various depths from a vehicle moving relative to the water, said system being of the type including a measuring probe unit adapted to descend ballistically in said body of water; said spool and cannister assembly comprising a first hollow cylinder having a closed end and an open end, a plurality of annular radially outwardly extending axially spaced apart ridges on said first cylinder adjacent to the open end thereof, a spool of wire wound on said first cylinder between said annular ridges, a terminal receptacle centrally positioned on the external surface of said cylinder, said terminal receptacle including at least one electrical contact connected to one end of said spool of wire and being filled with a penetrable insulating material, whereby contact can be externally made with said contact by piercing said compound, a cannister comprising a second hollow cylinder surrounding said first hollow cylinder and extending from said receptacle to beyond said open end of said first cylinder, said second cylinder having an external annular groove adjacent the open end thereof, and a removable cover positioned over the open end of second cylinder and having internal ridges engaging said external groove, whereby said second cylinder and cover sealingly cover said end of said first cylinder, handle means on said cover for enabling the removal of said cover, said cover further having projections extending internally into said first cylinder, whereby said probe unit may be stored within said first cylinder and held in place by said projections, the other end of said spool of wire extending into said first cylinder through said open end thereof for connection to said probe unit.

14. The arrangement of claim 13 wherein said receptacle is comprised of a pair of axially spaced apart generally rectangular plates molded transversely on said first cylinder, the one of said plates toward the open end of said first cylinder having an annular grooved ridge for engaging an end of said second cylinder to form a seal therebetween.

15. A spool and cannister assembly for use in a system for measuring the characteristics of a body of water, of a type wherein a measuring probe unit is adapted to descend into said body of water; said spool and cannister assembly comprising a first hollow cylinder having one enclosed end and adapted to receive said probe for storage and shipment, a spool of wire wound on the external surface of said first cylinder adjacent the open end thereof and having one end connected to said probe unit and being adapted to unwind as said probe unit descends in said body of water after a launching operation, a contact receptacle positioned externally on said first hollow cylinder between said spool of wire and said closed end thereof, said receptacle including at least one contact embedded in a penetrable insulating compound and connected to the other end of said spool of wire, whereby external contact with said contact may be made by a contact pin penetrating said compound, a cannister comprising a second hollow cylinder surrounding said open end of said first cylinder and extending from sealed relationship with said receptacle beyond said open end of said first cylinder, and a flexible cover removably sealed to the other end of said second hollow cylinder, said removable cover having a plurality of projections extending into said first hollow cylinder for engaging and holding a probe unit therein.

References Cited
UNITED STATES PATENTS 3,221,556 12/1965 Campbell et al.
3,339,407 9/1967 Campbell et al.
3,349,613 10/1967 Francis.

RICHARD C. QUEISSER, Primary Examiner

M. SMOLLAR, Assistant Examiner

U.S. Cl. X.R.

73—344